Patented Jan. 8, 1929.

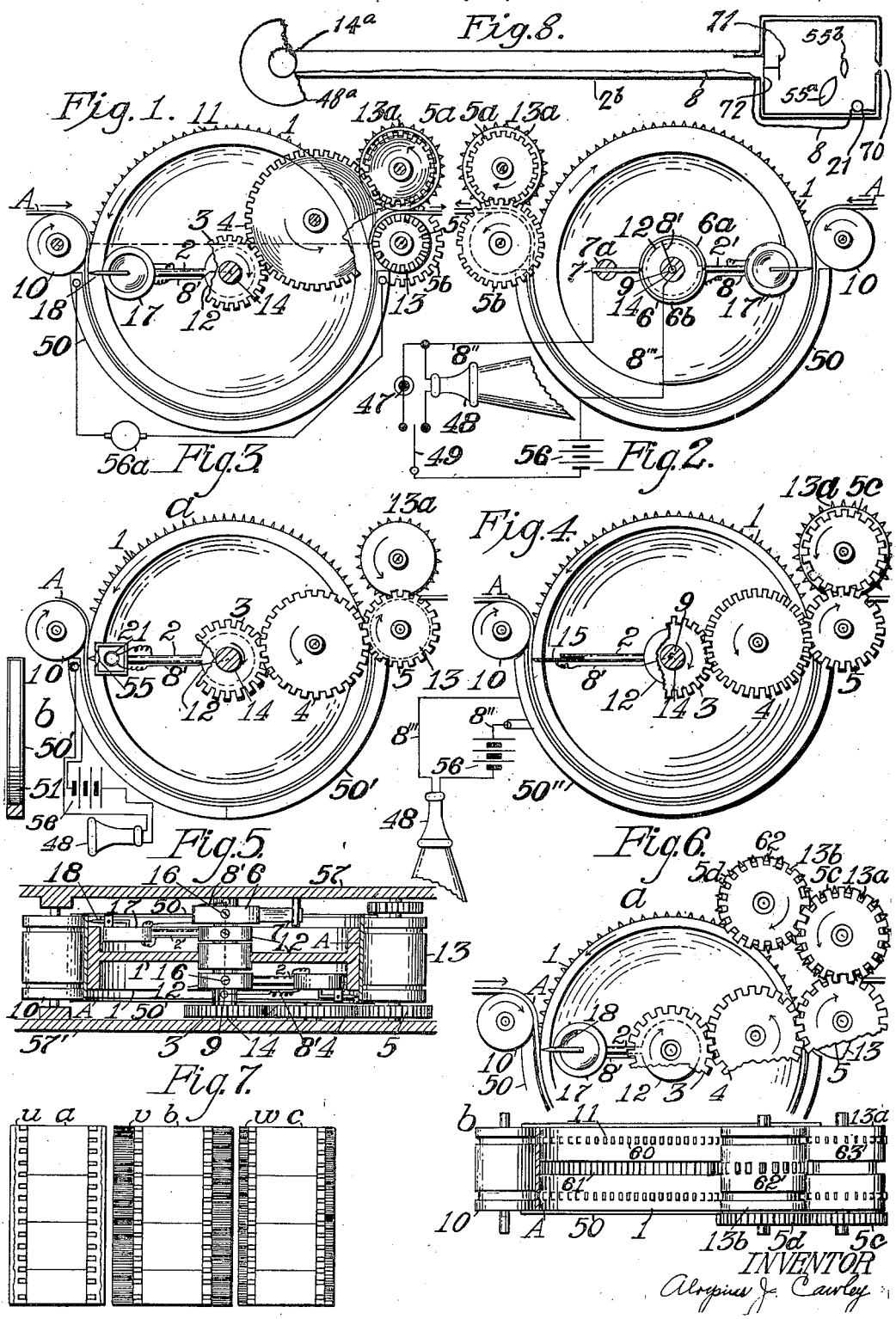

1,698,536

UNITED STATES PATENT OFFICE.

ALOYSIUS J. CAWLEY, OF PITTSTON, PENNSYLVANIA.

SOUND-RECORDING APPARATUS.

Application filed July 21, 1923. Serial No. 653,704.

This application is in part divisional to my application filed January 8, 1921, Serial No. 435,984.

The invention relates generally to the method of producing sound records on films as they pass through a motion picture camera, so that sound and picture records may be reproduced simultaneously after the films are developed and otherwise prepared. The invention is not necessarily limited to this field, as it may be used for other purposes.

More particularly, the invention is concerned with the recording of sound on a motion picture film at a recording speed that is much in excess of the speed of the film, being in fact a multiple of it. An arrangement is provided whereby both film and recorders or reproducers are simultaneously moved in opposite directions while in contact. The resultant speed is the sum of the speeds of both.

A plurality of recorders is provided. These recorders contact alternately with separate portions of the film. They are placed radially at fixed intervals, and one contacts with a record surface of a given length, while the surface has actually passed through but a fraction of this length. The other recorder is then in a position to perform a similar operation with another portion of the recording surface.

An arrangement is provided whereby the recorders are thrown out of operation when not recording their specific record groove.

Any sound recording speed which is a multiple of the film speed may be obtained by simply changing the gearing and the number of recorders or reproducers.

The invention is adaptable for use in recording and reproducing either mechanical or photographic sound records as herein described.

The apparatus is extremely flexible and a change from mechanical to photographic recording or reproducing may be made in a few minutes.

Although only a few types of recorders and reproducers are described in conjunction with the apparatus, still any type may be used, including the magnetic.

The records which are impressed on the margins of the motion picture films are of course intermittent in character. They are alternately recorded or reproduced. However, they are so fused as to consist of two continuous records parallel to each other.

The records may be placed on one margin only of the motion picture film, or may be distributed on both margins.

A sound recording speed that is double film speed is very desirable with this apparatus.

Although the recording and reproducing speeds are double film speed, neither the film nor the recorders move at this speed. The high speed is due to the relative motion of recorder and film.

For a more complete understanding of the invention reference is to be had to the following description and claims taken in connection with the accompanying drawings, in which like characters of reference denote corresponding parts in all the views, and in which, Figure 1, is an elevational view showing a recorder or reproducer impressing or reproducing a sound record groove on a standard motion picture film at a point where the latter is moving with a continuous speed. A thermoplasticizing means is also shown which facilitates recording.

Figure 2 is an elevational view of the opposite side of the apparatus shown in Figure 1. It shows the commutating arrangement, as well as the electrical circuits for recording or reproducing.

Figure 3 shows at $a$ a side elevational view of a photographic sound recording apparatus for use with a motion picture film. It may also be adjusted for reproduction by means of the photoelectric cell shown.

Figure 3 also shows at $b$ a view of the working surface of the photoelectric cell.

Figure 4 is a side elevational view of a reproducing means for use with a talking picture film. This apparatus reproduces a photographic sound record without the use of a photoelectric cell or light.

Figure 5 is a plan view, partly in cross-section, of the apparatus represented in Figures 1 and 2. It shows better the interrelation of the elements as well as the electrical connections.

Figure 6 shows at $a$ a side elevational view of a sound recording or reproducing apparatus having a more rigid type of gearing than shown in the earlier figures. At $b$ is shown a plan view, partly in cross-section, of this apparatus.

Figure 7 shows three types of film that may be used with the apparatus. A film provided with sound grooves is shown at $a$; one provided with a photographic record is shown at $b$; a metal photorecord is shown at $c$. Other types of sound record are adaptable for use with the apparatus, however.

Fig. 8 is a view of an adaptation of a mechanically vibrating mirror and fluctuating light source acting to make a very sensitive photographic sound recorder, to the present invention.

It is desired to strongly emphasize the fact that all of the different views shown are intended to illustrate a single piece of apparatus with interchangeable parts, and not a series of different machines. The apparatus may be converted from a photographic to a mechanical apparatus in a few moments.

Referring to Figure 1, the motion picture film A passes around sprocket wheel 1 and thence to the right. It is held in firm contact with this wheel by means of guide rolls 10 and 13 and teeth 11. This sprocket wheel is mounted loosely on shaft 14. Any suitable method of gearing may be used to operate this sprocket wheel. For instance, power may be applied to gear wheel 5ª, seen through 13ª which is represented as transparent in the drawings. Sprocket wheel 13ª is firmly mounted on the same shaft with 5ª, and is consequently driven by it. Gear wheel 5ª also drives gear wheel 5ᵇ which has sprocket wheel 13 and gear wheel 5 firmly mounted on the same shaft with it. Sprocket wheel 13 accordingly pulls the film to the right, while sprocket wheel 5 meshes with gear wheel 4, which in turn operates wheel 3 which is firmly mounted on shaft 14. This shaft is consequently turned in a direction opposite to that of the sprocket wheel 1. Firmly mounted upon shaft 14 by means of set screws or the like are the arms 2 and 2', the latter being shown in Figure 2. There is an angle of one hundred and eighty degrees between those two arms. The effect of this gearing is to move the film in a counterclockwise direction and to move the recorders or reproducers in a clockwise direction. In other words the film and arms carrying the recorders or reproducers move in opposite directions, their relative speeds being equal to the sum of both. By proportioning the gearing differently and adding additional recorders or reproducers, the arms may move at a multiple of film speed that is greater than 1. For instance, it may be twice film speed, and the relative speed is then three times film speed. The radial arms 2 and 2' may have attached to them any type of sound recorder or reproducer desired. The illustration in Figure 1 may serve for either a recorder or reproducer, as both have much the same appearance. In Figures 1 and 2 are shown recorders, consisting of telephone receivers 17 similar to the watch case receivers used on head sets. Those receivers have a stylus 18 attached to their diaphragms, which impresses a record in film A. For a better understanding of the operation of the apparatus, Figure 2 should be referred to. To record, switch 49 is turned to the left, throwing the acousticon or telephone transmitter 47 into the circuit with battery 56. The transmitter receives the sound waves and converts them into electrical pulsations in the circuit made up of battery 56, switch 49, wire 8", brush 7 supported on support 7ª, and either commutator segment 6ª, or 6ᵇ, of commutator 6. This commutator is shown in Figure 2 at the position where brush 7 is leaving one segment and coming in contact with the other; it is for a slight fraction of a second in contact with both segments 6ª and 6ᵇ. However, it will be very shortly, in contact with segment 6ª entirely. The remainder of the circuit is then composed of segment 6ª, wire 8' through passage 9 in shaft 14 to the opposite side of the apparatus 17, whose coil is thus actuated to vibrate its diaphragm in the usual manner of telephone receivers. The diaphragm in turn vibrates stylus 18 which is attached to it. The stylus, 18, being in contact with film A, impresses a sound record groove in it.

To facilitate recording upon film A, a heating device 50, similar to that described in my Patent No. 1,420,304, is employed. A source of power 56ª, which may be a battery or dynamo, supplies the energy for the heater. The heater 50 is placed so that it just barely clears the film A, and offers no resistance to its passage. The stylus 18, of course presses film A against the heater 50 at the recording point only. This offers a means of steady support to the film, but it is not absolutely essential. Obviously the heater 50, when not heated, as in reproduction, also acts as a support for the film in reproduction. It may be made so as to possess considerable resiliency, and thus hold the stylus and film in perfect contact.

To reproduce, switch 49 is turned to the right, and thus cuts in a sound receiving and amplifying device, which is here shown as a loud speaking telephone receiver provided with an amplifying horn 48. In reproducing, reproducers 17 and 17' consists of telephone transmitters which may have the same appearance in the views shown as the recorders. In this case, the record groove on film A causes stylus 18 to vibrate, and this in turn brings about the vibration of the diaphragm. The diaphragm produces fluctuations in the electric current traversing the transmitter by varying pressure on the carbon granules or the like. This fluctuating current passes through wire 8', segment 6ª, brush 7, wire 8", receiver 48, switch 49, battery 56, wire 8''', shaft 14 and arm 2 to transmitter 17 by means of the upper wire 8ᶜ in Figure 1.

The exact proportions of the relative diameters of the gear wheel is not implied in the drawings.

The apparatus shown in Figure 3 at $a$ and $b$ is merely that shown in Figures 1 or 2 with the recorder or reproducer 17 replaced by a photographic recorder. The film is moved to the right in the manner already described. The arm 2 is moved in a direction directly opposite to that of the film. The same means of connecting either a telephone receiver or a microphone to the apparatus is used as is illustrated in Figures 1 and 2. However, on the end of arm 2, there is a small light-tight case containing a small tubular incandescent lamp 21. This lamp is mounted with its axis at right angles to that of arm 2. Its light is concentrated into a small narrow beam by means of the cylindrical lens 55; a cylindrical light condenser may be provided in the obvious manner between light 21 and lens 55. The result is that a sharp, narrow horizontal line of light is thrown upon the internal surface of the margin of film A.

In recording, the sound waves are impressed on a microphone, which is identical with that shown in Figure 2. The current passes through the same circuit with the exception that it passes through the tubular lamp 21 instead of the telephone 17. The fluctuating current in light 21 causes its illumination to fluctuate in intensity in accordance with speech or other sounds. As the arm 2 is revolved, it sweeps along the film margin and produces a developable record of the fluctuations of the light. When developed this will present a band of light which varies in degree of light or shade as shown in Figure 7 at $v$ on film $b$. Battery 56 may be of such power as to light lamp 21 (which may be of low voltage) and still permit the telephone transmitter to be in series with it. However, it is better to have the battery and transmitter (or receiver) connected in parallel with each other in the well-known manner.

In reproducing the photographic record, lamp 55 is lighted and gives a steady illumination. The arm 2 moves it at a uniform speed over the film as the latter is moved in the opposite direction. The gradations in the photographic record on the film causes the intensity of the light from 21 to fluctuate accordingly, as it shines through the film. There is thus a variation in the intensity of the light falling upon the face 51 of the selenium cell 50′, shown more clearly at $b$, Fig. 3. Any photoelectric cell, such as those using barium, potassium, cæsium, etc., may be used in place of 50′. This fluctuation of the light acting upon the cell causes a variation in its intensity in the well known manner, with the result that the electric current in the circuit supplied by battery 56′ and actuating receiver 48′, Figure 3, is fluctuated accordingly. The result is that the original sounds are duplicated by receiver 48′. This circuit therefore consists of electric cell 50′, battery 56 and receiver 48′. This is merely a conventional showing of the circuit, as induction coils, vacuum tubes and circuits may be used for amplification as desired.

In my copending application, Serial Number 435,983, filed January 8th, 1921, is described a process of making a metallic foil sound record from a photographic sound record, and means for reproducing it without the use of a photoelectric cell or light. Such records may be used with the herein described apparatus.

For direct electrical reproduction of a photographic sound record, the apparatus is adjusted as shown in Figure 4. The photographic record is capable of conducting an electric current, and causing fluctuations in it due to the varying resistance of the light and dark bands. The arm 2 is provided with a contact blade 15 which makes connection with the photographic record. Suitable gearing move the reproducer and film in opposite directions as usual. An additional gear wheel $5^c$ is added which coacts with wheel 5, which turns sprocket wheel $13^a$. Wheels $5^a$ and $5^b$ of the previous figures are unnecessary. Wheel 5 also operates wheel 4. Figure 4 only applies to reproduction. The record is photographed by an apparatus similar to that of Figure 3 and is then subjected to the above mentioned process. The result is a metallic record on the margins of the motion picture film which permits of the reproduction of the record without the interposition of a photoelectric cell. Such a record is shown in Figure 7 at $w$ on the margin of film $c$. This record is not as broad as that at $v$ of the same figure, as the excellent conductivity of the record permits of narrowing. 50″ is merely a contact strip, by means of which the metallic sound record overhanging the margin of the film A, makes electrical connection. This permits of the use of one contact blade 15 on each of the arms, such as 2. If strip 50″ is not used, two contact blades must be used, as shown in the application just referred to. In operation, contact blade 15, coming into contact with the sound record on the margin of the film, meets with varying amounts of electric resistance in the strip with the result that the passing current is fluctuated in intensity corresponding to the original sounds. There is in this figure as in the others, two narrow strips corresponding to 50″ on either side of the apparatus. Neither strips 50, 50′ nor 50″ cover the whole width of the film, one being provided for each margin. The electrical connections are the same as those of Figure 2. Current flows from battery 56 to receiver 48 to wire 8‴, to commutator on opposite side, similar to Figure 2, through wire 8′ passing through channel 9 in shaft 14 to contact blade 15 through film A, to contact strip 50″, and back to the battery. There is a bifurcation of the conductor connecting battery 56, one branch going to strip 50″ on the side of the observer, and the other going to a similar strip on the opposite side.

Figure 5 is a plan view of the apparatus shown in Figures 1 and 2, but may serve to illustrate any, as the difference is merely in the type of sound recorder or reproducer attached to arm 2. Wheel 1 is cut horizontally to show the manner of arrange all of the elements. Attention is drawn to the fact that the recorder or reproducer 17 may be located entirely within sprocket wheel 1, with only the stylus projecting and engaging with the film; also to the fact that the arms 2 are detachable by means of set screws 16. The same is true of the commutator 6 and sprocket 3. Arm 2 fits into a hole in the recorded such as 17, and is held firmly in that position by means of screws. It is only necessary to loosen the screws and slide off the recorder and put a different one on in its place, to have a change from one type of recording or reproducing to another. Or a change may be made by removing frame 57′, and taking off sprocket 13 by loosening the set screws. By also taking off arms 2, sprocket wheel 1 and arm 2′, and substituting for 2 and 2′, arms having recorders such as that in Figure 3, and adding the corresponding element 50′, and of course replacing sprocket wheel 1, a change is made to any of the types of sound recording or reproduction. This is particularly desirable, as the future art of talking picture production will call for it, as all types will be used, and it is believed that the mechanical groove type as shown in Figures 1 and 2, will be the most universally used because of its simplicity and cheapness.

Figure 6 shows an elevational view at $a$ and a plan view at $b$, and is intended to illustrate the fact that the film need not be depended upon to move the sprocket wheel 1. Power is applied to 5 or $5^c$, while $13^a$ is rigidly attached to the same shaft as $5^c$, and its teeth engage the film A. Gear wheel 5 operates wheel 4, and the latter operates wheel 3 in the manner already described in connection with the other figures. Wheel $5^c$ engages with $5^d$, rigidly mounted on same shaft with $13^b$, which carries a central row of sprocket teeth 62. Those teeth engage with a series of sprocket holes 61 shown at the bottom of a shallow groove in wheel 1. $13^b$ is also provided with grooves to accommodate teeth 11 of sprocket wheel 1 and teeth 63 of sprocket $13^a$. This arrangement offers a rigid connection and insures absolute precision of movement of all the parts.

Figure 6 also illustrates the fact that the stylus need not come into contact with the film until the precise instant that the record is to be impressed or reproduced. Stylus 18 is shown in a position in the figure where it has just finished impressing its record. The stylus on the opposite side, precisely 180 degrees away, is just starting to impress its record. Even the very slightest overlapping is prevented by the following arrangement. Wheel 10 is placed so that it does not hold the film in absolute contact with wheel 1, but a slight distance, which is a very small fraction of an inch, is left. The stylus 18 on the opposite side is therefore barely free from the film surface until it reaches the point where it is to start recording, when the contour of strip 50 is such as to bring film and stylus in close contact. The stylus to the left of the figure, having completed its record groove, is suddenly withdrawn from the film by the contour of strip 50 and by the position of wheel 10. This is desirable with the mechanical type of recording, as even though the stylus is not vibrating while in contact with an area of the film other than its own, it may destroy a record already existing thereon. Although the commutator prevents overlapping of recording or reproduction of sounds which are not desired to be recorded or reproduced, it cannot prevent injury to the record as stated above. This can only be prevented by avoiding actual contact. The contour of strip 50, therefore, is such as to bring stylus and film into firm contact up to the point shown in Figure 6 to the left of $a$. After that there is an instant separation. It is such, also as to bring the opposite stylus and film into firm contact at a point 180 degrees removed from that just referred to, and to hold that stylus and film in perfect contact until it reaches the position shown in the figure, but on the opposite side. In the photographic and electric process described above, the light 21 is turned off by the commutator and can do no further damage. In reproducing, the commencement of the face of the selenium cell 51 determines the point where the reproducing beam of light will cease to act. A groove is provided in gear $13^a$ to accommodate teeth 62 of gear $13^b$.

The different types of sound records mounted on their corresponding motion picture films, produced by and reproducible with the various types of recorders and reproducers described are illustrated in Figure 7. The picture film $a$ is shown provided with a sound record groove on each margin, one of the grooves being indicated by $u$. A film $b$ provided with photographic sound records $v$ on its margins is also illustrated. The film $c$ is shown provided with a metallic photographic record $w$, which sufficiently overlaps its margin to make contact with strip 50″ of Figure 4. It will be noticed that the photographic record $v$ is broader than the other two. This is due to the fact that the photoelectric cell 50′ requires a considerable area of record surface to operate it, due to the lack of sensitiveness of the cell and to the fact that the variations in a light beam are necessary for co-operation therewith. Record $w$, on the other hand is highly conducting, due to the fact that it is formed upon copper or silver, or the like. Those are perfect conductors of electricity and permit a very large volume of current to pass for a small area of surface. They can be made very narrow as a consequence. Film $a$ is of course of precisely the same dimensions as the standard motion picture film, and requires no expensive or troublesome photoelectric cell, light or optical system.

By running the records at standard motion picture film speed and by having the sound recording means run at a multiple $1$ of the film speed, the sound is recorded or reproduced at two feet per second. It is sometimes customary to run motion picture films of solemn processions and the like at slow speed. By this invention, films running at nine inches per second will record sound at eighteen inches, which is the standard phonographic recording speed of commercial records. The flexibility of the invention in this particular is not to be underestimated.

Figure 8 illustrates another type of photographic sound recorder which may be applied to the device. The shaft $14^a$ is hollowed out so that sound waves may be introduced into it, as by means of megaphone $48^a$. The arm $2^b$ is also hollow and communicates with $14^a$. There is a similar tube on the opposite side and 180 degrees differently disposed in the manner described. Diaphragm 72 closes tube $2^b$ and is vibrated by the sound waves therein. Diaphragm 72 in turn vibrates mirror 71, and the latter vibrates the beam of light from lamp 21. By passing through condensing lens $55^a$, the beam is concentrated upon the mirror and thence passes through lens $55^b$ to slit 70. All of those elements are enclosed in the casing shown carried on the end of the tube. This part of the apparatus records the sounds in a dark band having laterally projecting saw-teeth, or "peaks". In addition, wires 8 carry the current as described in connection with the other figures from the microphone. Its intensity of current varies, with the result that the intensity of the light of lamp 21 is varied. Therefore, both the intensity and position of the light beam are varied. It is obvious that when the microphone is compressed, the light is more intense, and when diaphragm 72 is compressed the beam is thrown to one side. When released the beam passes to the opposite side to form the "peak", since the pressure on the diaphragm 72 and on the microphone is released, the intensity of the light is diminished. The result is that the "peaks" are also of a fainter texture. Obviously, the "bases" are of a more intense blackness. This feature combines the two types of photographic sound recording, that of varying the direction of a beam and that of varying its intensity. The result is a process which adds the sensitiveness of both. No claim is made upon the novelty of either, the novelty being in their combination. Many modifications may be made in this combined feature without departing from the spirit of the invention. For instance, many different types of circuit arrangements may be illustrated, such as those using induction coils, vacuum tubes and the like. But this would not cover any new patentably different features, and would only lengthen the specification.

This feature was described in my copending application Serial Number 435,983, of Jan. 8, 1921.

Having described my invention, I claim as new and desire to secure by Letters Patent:

1. The process of recording sound vibrations on a film, which consists of moving the film in one direction and simultaneously moving sound recorders in the opposite direction while in intermittent and alternate contact with said film, and permitting but one recorder to function at a time to impress a high speed sound record consisting of two parallel records on said film.

2. A sound record apparatus consisting of gear and sprocket wheels for moving a film in one direction and also moving equally spaced radial arms carrying electromechanical sound recorders in the opposite direction while intermittently and alternately contacting with said film to impress a high speed sound record consisting of two parallel grooves.

3. Sound record apparatus consisting of means for moving a film in one direction and means for simultaneously moving equally spaced radial arms carrying sound recorders in the opposite direction, and means for intermittently and alternately contacting said sound recorders with said film to form a high speed sound record consisting of two parallel sound records on said film.

4. Sound record apparatus consisting of means for moving a film in one direction and means for moving radial arms carrying detachable sound recorders in the opposite direction while intermittently and alternately contacting with said film to impress a high speed sound record consisting of two parallel records on said film.

5. Sound record apparatus consisting of means for moving a film in one direction and means for moving sound recorders in the opposite direction while in intermittent and alternate contact with said film and commutating means to insure the functioning of but one recorder at a time, to form a high speed sound record consisting of two parallel sound records on said film.

6. Sound record apparatus consisting of gearing for moving a film in one direction and gearing for moving equally spaced sound recorders in the opposite direction, means for intermittently and alternately contacting said recorders with said film to impress a high speed sound record consisting of two parallel sound records, and a commutator to insure the functioning of but one recorder at a time.

7. Sound record apparatus consisting of gearing for moving a film in one direction and gearing for moving equally spaced sound recorders in the opposite direction, means for intermittently and alternately contacting said recorders with said film to impress a high speed sound record consisting of two parallel sound records, a commutator to insure the functioning of but one recorder at a time, and means for thermoplasticizing the portion of said film upon which the sound grooves are to be impressed.

8. Sound record apparatus consisting of means for moving a film in one direction and means for moving equally spaced radial arms carrying sound record elements in the opposite direction, means for intermittently and alternately contacting said record elements with said film, and means to permit but one of said sound elements to function at a time, to form a high speed sound record consisting of two parallel sound records on said film.

9. Sound record apparatus consisting of gear and sprocket wheels for moving a film in one direction and also moving equally spaced radial arms carrying electromechanical sound recorders in the opposite direction while intermittently and alternately contacting with said film, a commutator to insure the functioning of but one recorder at a time, to impress a high speed sound record consisting of two parallel sound records in said film.

10. Sound record apparatus consisting of gear and sprocket wheels for moving a film in one direction and also moving equally spaced radial arms carrying electromechanical sound recorders in the opposite direction while intermittently and alternately contacting with said film, a commutator to insure the functioning of but one recorder at a time and curved resilient supports to support and thermoplasticize said film, to impress a high speed sound record consisting of two parallel sound records on said film.

11. Sound record apparatus consisting of means for moving a film in one direction and means for moving sound recorders while in intermittent and alternate contact in the opposite direction, means for insuring the functioning of but one recorder at a time, and thermoplasticizing means of such contour as to bring stylus and film into firm contact at a precise point and of releasing said firm contact at a point directly opposite thereto, to impress a high speed sound record consisting of two parallel sound records on said film.

Pittston, Pa., September 22, 1922.

ALOYSIUS J. CAWLEY.